June 8, 1948.　　　　R. R. LOCKE　　　　2,443,075
VARIABLE SPEED TRANSMISSION
Filed Feb. 13, 1946　　　　2 Sheets-Sheet 1

INVENTOR
Robert R. Locke

June 8, 1948. R. R. LOCKE 2,443,075
VARIABLE SPEED TRANSMISSION
Filed Feb. 18, 1946 2 Sheets-Sheet 2

INVENTOR
Robert R. Locke

Patented June 8, 1948

2,443,075

UNITED STATES PATENT OFFICE 2,443,075

VARIABLE-SPEED TRANSMISSION

Robert R. Locke, Framingham, Mass.

Application February 18, 1946, Serial No. 648,309

10 Claims. (Cl. 74—286)

My invention relates to improvements in variable speed transmissions of the form employing gearing intermediate a drive and driven shaft, said gearing being of the so-called planetary or differential type having three main parts or portions, wherein one portion is operated at constant speed by the drive shaft, another portion transmits the motion at a variable speed to the driven shaft and the third portion is permitted to recede at controlled variable speed for the purpose of effecting variable speed intermediate the drive and driven shafts. The main object of this invention is to provide simple, yet effective means to control the receding third portion of the transmission that function correlatively as the speed of the transmission is changed. Another object is to provide a simple means of cooling the transmission that is effective correlative to the amount of heat generated by the transmission for the purpose of retaining the transmission at a substantially normal operating temperature at all transmitted speeds thereby affording maximum efficiency of operation and minimum of maintenance requirement. I conceive to effect these objectives through the utilization of a common means hereinafter set forth.

In the accompanying drawing—

Figure 1:
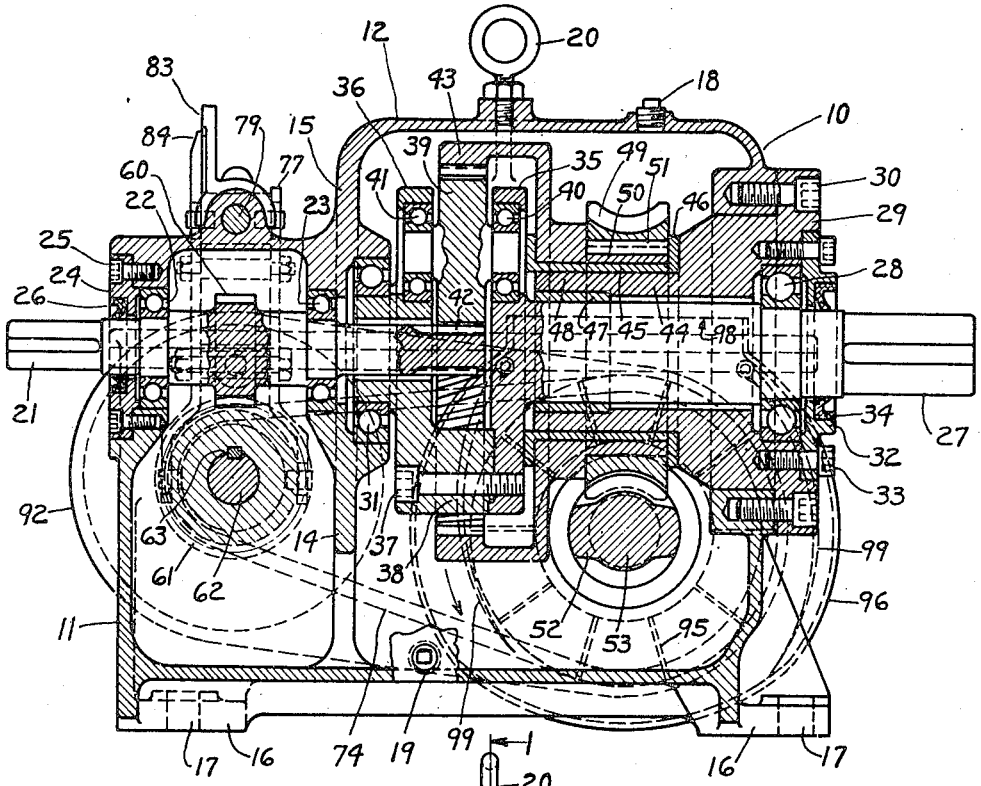
Figure 1 is a sectional side elevation of my improved variable speed transmission taken at 1—1 on Figure 2 or 3.
Figure 2:
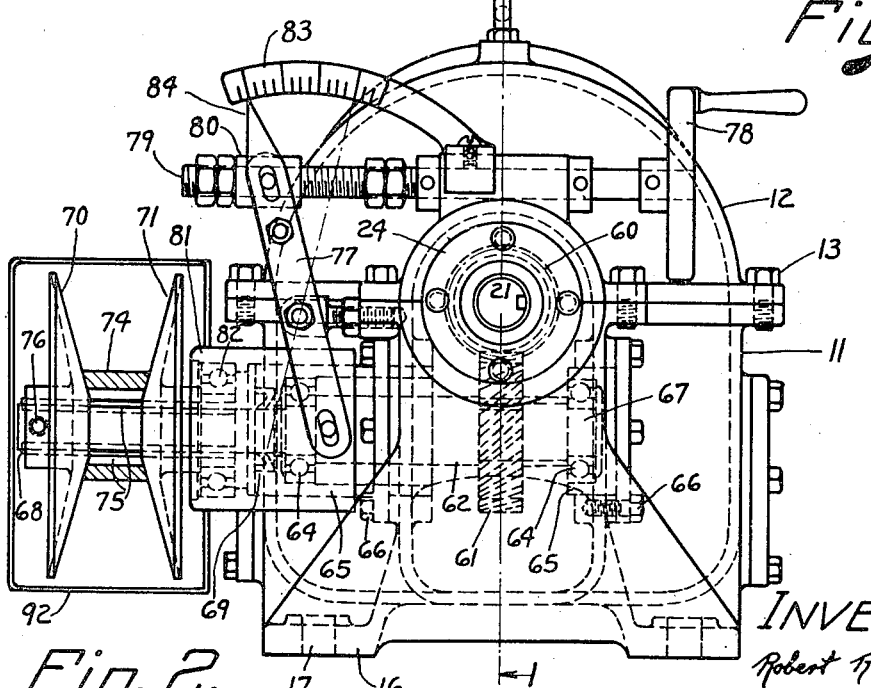
Figure 2 is an end elevation of same taken at the end of the drive shaft to show the speed control operating mechanism.
Figure 3:
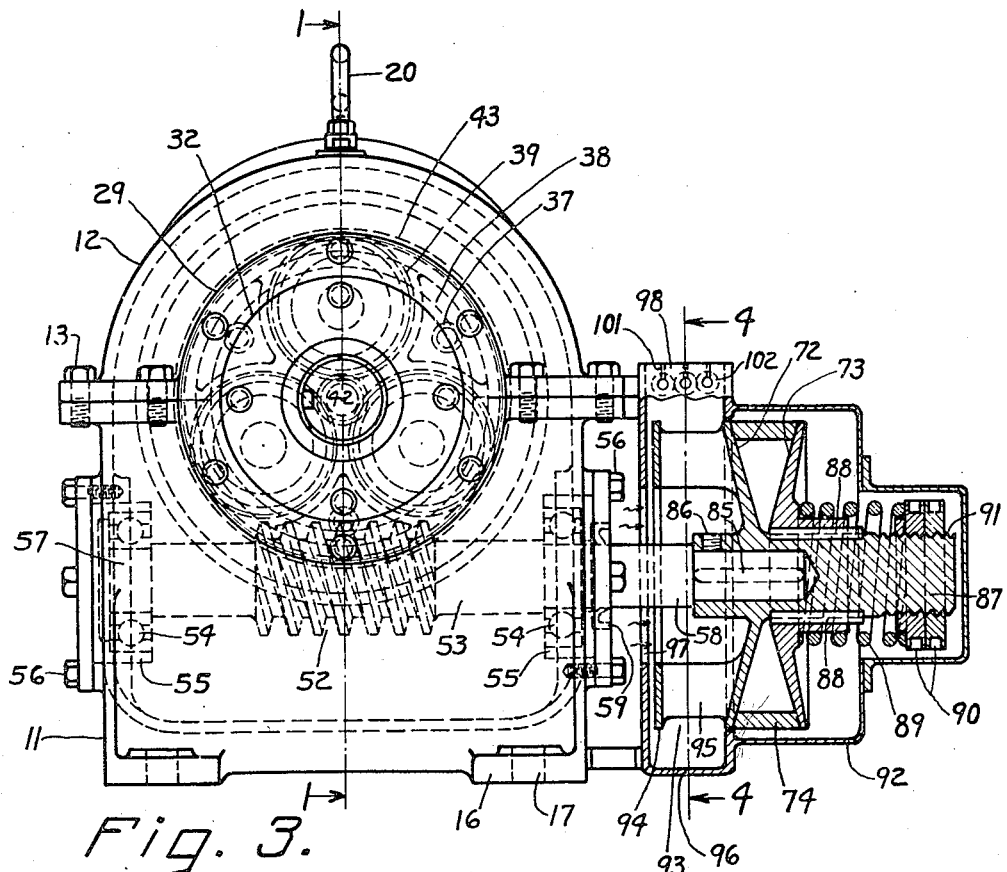
Figure 3 is an end elevation of same taken at the end of the driven shaft to show the worm gear retarding means.

My improved variable speed transmission comprises a casing 10, constructed of a lower section 11 and an upper section 12 fastened together by cap screws or studs 13. Sections 11 and 12 have adjacent integral inner walls 14 and 15 to support bearings for the inner ends of the drive and driven shaft, respectively. Lower section 11 has feet 16, at the bottom portion thereof, with bolt holes 17 to be utilized in mounting the transmission to a base or other anchorage. The casing is generally partially filled with oil to lubricate the interior gearing and bearings, which is common practice in the art, and plugs 18 and 19 are provided for the purpose of adding and draining the oil, respectively. A lifting eye 20 is provided on the casing for convenience in hoisting the transmission into operating position as required. A drive shaft 21, generally rotating at high speed, is journaled in bearings 22 and 23 supported in the casing 10 and a retaining disc 24 is secured in casing 10 by cap screws 25. An oil seal 26 is provided to prevent oil escaping from the casing. A driven shaft 27 is journaled in a bearing 28, supported in a cylindrical plug 29 secured in casing 10 by cap screws 30, and in a bearing 31 supported in the inner wall of casing 10. A retaining disc 32 is secured in plug 29 by cap screws 33. An oil seal 34 is provided to prevent oil escaping from the casing. The inner end of driven shaft 27 is composed of an integral flange 35 and a similar flange 36 bolted thereto by means of cap screws 37. Flange 35 is positioned in spaced relation to flange 36 by a plurality of bosses 38 integral with flange 36 and there are a plurality of planet gears 39 rotatively mounted therebetween in bearings 40 and 41 supported in flanges 35 and 36, respectively. Planet gears 39 are positioned at equal circumferential spacings around a sun gear 42 formed on the inner end of drive shaft 21 and mesh therewith and also mesh with an internal gear 43.

Internal gear 43 is rotatively mounted on a sleeve 44 which is an integral part of plug 29. Bearing bushing 45 and thrust washer 46 are provided for the internal gear 43 and also a bearing bushing 47 is provided between sleeve 44 and driven shaft 27, when required, to assist in supporting the inner end 48 of sleeve 44 to withstand the relatively heavy overhanging weight of the internal gear assembly, especially in transmissions of heavy capacities. A worm gear 49 is mounted on the hub 50, of internal gear 43, by key 51 and meshes with a worm 52 formed integral with a shaft 53. Shaft 53 is journaled in bearings 54 supported in sleeves 55 which are secured in lower section 11, of casing 10, by means of cap screws 56. Shaft 53 is generally mounted perpendicular to the axis of worm gear 49 to position worm 52 most effectively to cooperate in checking the rotation of said worm gear which is generally subjected to heavy reacting pressures. One end 57, of shaft 53, terminates within its supporting sleeve 55 and the other end 58 extends outside of casing 10 for the purpose of receiving variable speed controlling mechanism hereinafter described and an oil seal 59 is provided.

A spiral gear 60 is formed integral with drive shaft 21, generally intermediate bearings 22 and 23, and meshes with a spiral gear 61 secured on a shaft 62 by key 63. Shaft 62 is journaled in bearings 64 supported in sleeves 65 which are secured in lower section 11, of casing 10, by means of cap screws 66. Shaft 62 is generally mounted parallel to shaft 53 to facilitate the two shafts being connected by a common variable speed controlling mechanism to be described. One end 67, of shaft 62 terminates within its supporting sleeve 65 and the other end 68 extends outside of casing 10 for the purpose of receiving variable speed mechanism hereinafter described and an oil seal 69 is provided.

A pair of cone discs 70 and 71 are mounted at the outer end 68, of shaft 62, and a similar pair of cone discs 72 and 73 are mounted at the outer end 58, of shaft 53, for the purpose of cooperating with a common V-belt 74. Cone disc 70 is secured to shaft 62 by means of keys 75 and set screw 76, and disc 71 is mounted to rotate with shaft 62 by means of keys 75, but is free to move laterally on said shaft for the purpose of shifting the position of V-belt 74 intermediate the said discs. The lateral movement of disc 71 is accomplished by means of shifter lever 77 which is controlled by hand wheel 78 through medium of screw 79 and nut 80, shifter spool 81 and ball thrust bearing 82, all of which are within the knowledge of the mechanic and thus should require no further explanation. An indicator 83 and a pointer 84 made integral with lever 77 are provided to facilitate minute speed adjustment.

Cone disc 72 is secured to shaft 53 by means of key 85 and set screw 86, and disc 73 is mounted on a hub 87, which is an integral part of disc 72, and rotates therewith by means of keys 88, but is free to move laterally on said sleeve for the purpose of shifting the position of the V-belt 74 intermediate the said discs. Disc 73 is held in resilient contact with V-belt 74 by means of compression spring 89, which will retain operating tension on the said belt at all times as discs 70 and 71 are adjusted. It is obvious that discs 72 and 73 will be automatically adjusted relatively by spring 89 to meet any manual adjustment of discs 70 and 71. Spring 89 is held in contact with disc 73 by adjusting nuts 90 which have threaded engagement 91 with hub 87, of disc 72, and can be adjusted to proper operating condition by means of said nuts. Therefore, the speed of shaft 53 and, resultantly, the speed of driven shaft 27 can be readily changed by manipulation of handwheel 78 as this would effect a change in the relative operating position of V-belt 74 on the cone pulleys, thereby effecting changes in the effective diameters of the said pulleys. A guard 92 is provided for the V-belt drive.

Figure 4:
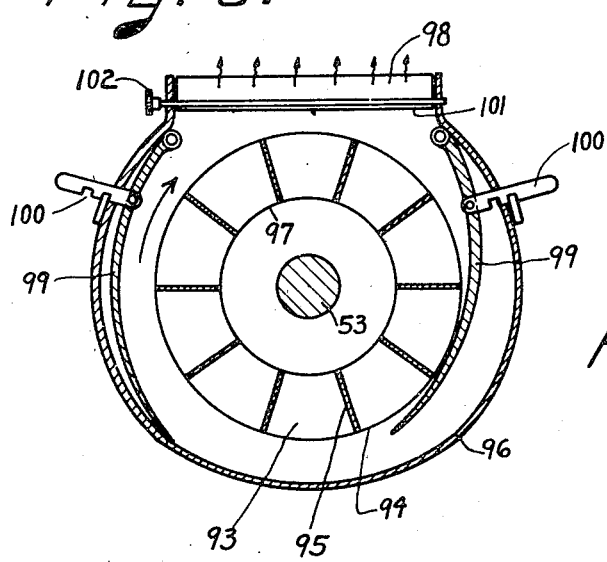
Figure 4 is a fragmental section taken at 4—4 on Figure 3 to show the correlative speed controlling and cooling means.

A fan wheel 93 is formed on the back of cone disc 72 and comprises an integral ring plate 94 held in spaced relation to said disc by a plurality of integral blades 95 positioned radially about the axis of shaft 53. A fan wheel housing 96, having an intake opening 97 and an exhaust port 98, is provided for fan wheel 93. The housing 96 could be made an integral part of belt guard 92, as shown, or could be formed as a separate unit independent of said guard. Also, fan wheel 93 could be constructed as an independent unit instead of being formed on the back of disc 72. The fan assembly, as shown, is arranged to exhaust the heated air from around the casing 10, adjacent to worm 52, which is the point where the greatest amount of heat is generated in the transmission due to the relatively heavy reacting pressures imposed on the worm gearing, and to discharge same into the atmosphere thereby effecting a cooling of the transmission. Although this appears to be the preferred arrangement the process could be reversed and cooler air taken from the atmosphere by the fan and blown onto the casing to effect cooling thereof. It is obvious that exhaust port 98 could be piped to any desired remote point as required. As best shown in Figure 4, the fan wheel blades 95 are made radial, and adjustable baffles 99 are provided to cooperate therewith, to afford fan action in either direction of rotation, the baffles 99 being required to be adjusted to meet the desired rotation. Any simple means such as notched bars 100 could be provided to hold the baffles 99 in proper operating position. Obviously, other forms and arrangement of exhaust fans could be utilized in place of that shown to achieve similar results.

Those skilled in the art of transmissions are aware that if the driving shaft of a planetary transmission, such as shaft 21 of the transmission shown, is rotated, the planet gears 39 will rotate and will transmit rotation to the internal gear 43. It is also well known that by holding the internal gear while the driving shaft is rotated, the planet gears will travel around the sun gear 43 and will thus cause rotation of the driven shaft 27 in the direction of the drive shaft 21. Also it is well known that if the internal gear is driven or permitted to rotate at various speeds the rotation of driven shaft 27 will be effected accordingly, and also the driven rotation of the internal gear could be such as to cause the driven shaft to be rotated in the reverse direction to the drive shaft. Therefore, it is obvious that the rotation of the driven shaft 27 of the transmission shown can be minutely adjusted from the maximum permitted speed in the direction of the rotation of the driving shaft 21 down to zero and up to its maximum permitted speed in the reverse direction by manipulation of handwheel 78.

In operation it is essential that worm gear 49 be permitted to rotate in the direction of the torque imposed on same by the operation of the transmission, therefore, the hand of threads on worm 52 and worm gear 49 should be constructed in cooperation with the hand of teeth on spiral gears 60 and 61 to permit such a rotation. Worm 52 is made with a plurality of threads to afford proper angle, or lead, to the threads for the purpose of permitting worm gear 49 to rotate worm 52 whenever said gear is subjected to a pressure resulting by the transmission being operated under a load. Because of the worm gearing being reversible, it is obvious that no power other than the reacting pressure on the worm gear is required to cause recession, with the result that the transmission would be of higher efficiency than if the worm and gear were of the so-called self-locking type. Also it is obvious that the function of the V-belt is to retard, or hold, the recession at a set speed. Therefore, the effectiveness of the V-belt to control the speed of the worm is dependent on the operating diameter, or lever arm effect, of V-pulley 72 and 73 and the area of belt contact therewith.

As the speed of the worm increases the effective lever radii of the pulley decreases in direct ratio therewith. Also the area of V-belt contact with the pulley decreases in direct ratio therewith. Furthermore, the friction in the worm gearing decreases as the operating speed increases. Therefore, the effectiveness of the V-belt to control the recession of the worm decreases between 2 and 3 to 1 as to the increase in worm speed and, for this reason, a much larger V-belt drive would be required to control the recession of the worm at the lower output speeds of the transmission than at the higher output speeds. The main objective of this invention is to provide a means that will function correlative to counteract this inherent weakness in a V-belt drive to control the receding member of a transmission for the purpose of permitting the use of a relatively smaller V-belt drive. This objective is accomplished by mounting a fan wheel 93 on the worm shaft for the purpose of effecting a brakeage or retarding thereof. Since the braking power of a fan wheel is proportional to the cube of its speed, it is obvious that as the speed of the worm increases the fan wheel 93 will afford increasing braking effect to the worm substantially relative to the decrease in effectiveness of the V-belt to control the recession of the said worm. Therefore, the fan wheel will function substantially correlative with the V-belt in controlling the worm speed.

A further objective of this invention is to provide a means to afford a cooling effect to the transmission substantially correlative to the heat generated therein. The greatest amount of heat generated in the transmission is generated by the worm gearing because of the relative heavy pressure imposed on same. Also, the worm gearing is the only gearing that changes in pitch line velocity whenever the output speed of the transmission is varied and, therefore, is the only medium that would cause temperature fluctuations in a transmission operating under a steady load. Therefore, as the worm increases in speed the operating temperature of the transmission will rise. The operating temperature of the transmission would fluctuate relative to the speed of the worm. In order to counteract such fluctuations in temperatures at all operating speeds, I conceive to further utilize fan wheel 93 by adapting it, to either remove the heated air from around the casing at the worm shaft, which is the point where the greatest amount of heat is generated, or to arrange same to displace air from the atmosphere onto the casing at this point. Inasmuch as a fan displaces air in volume directly to its speed, it is obvious that fan wheel 93 will function to effect a cooling to the transmission substantially correlative to the amount of heat generated therein.

Should it be desirable in certain constructions to provide means to control the flow of air or the braking effect of fan wheel 93, adjustable louvers or shutters 101 could be provided at the exhaust port 98. Pivoted type of shutters are shown which are arranged to be operated in unison outside of the casing by gears 102. However, any other conventional means could be provided to operate same, also, other types of shutters could be utilized in place of that shown.

It is obvious that other forms of planetary gearing, and also forms of so-called differential gearing, that have three main parts or portions could be harnessed in the manner set forth by applicant to achieve similar results. I do not wish to be confined to the exact details shown as same are susceptible of modification without departing from the spirit or scope of the invention broadly set forth in the claims.

I claim:

1. A variable speed transmission comprising a casing, a drive and driven shaft, and gearing intermediate said shafts, said gearing comprising three main parts or portions, one portion being integral to said drive shaft, another portion being integral to said driven shaft, and the third portion being a controlled rotating member arranged to recede to effect changes in speed intermediate the drive and driven shafts, and means to control the recession of said third portion from said drive shaft comprising three parts, one of said parts being a retarding means comprising a worm gear mounted integral with the recession member, and a worm mounted to cooperate therewith, said gear and worm being of the reversible form to permit recession of the said third portion when same is subjected to operating pressure, another of said parts being an adjustable V-belt drive operated from said drive shaft to control the speed of said worm, and the third part being a retarding means comprising a fan wheel mounted on said worm to cooperate substantially correlatively with said V-belt to control the speed of said worm, and said fan wheel being arranged to effect a cooling of the transmission.

2. A variable speed transmission comprising a casing, a drive and driven member, and gearing intermediate said members, said gearing comprising three main parts or portions, one portion being integral to said drive member, another portion being integral to said driven member, and the third portion being a controlled rotating member arranged to recede to effect changes in speed intermediate the drive and driven members, and means to control the recession of said third portion from said drive member comprising three parts, one of said parts being a retarding means comprising a worm gear mounted integral with the recession member, and a worm mounted to cooperate therewith, said gear and worm being of the reversible form to permit recession of the said third portion when same is subjected to operating pressure, another of said parts being an adjustable V-belt drive operated from said drive member to control the speed of said worm, and the third part being a retarding means comprising a fan wheel mounted on said worm to cooperate substantially correlatively with said V-belt drive in controlling the speed of said worm, and said fan wheel being arranged to effect a cooling of the transmission.

3. A variable speed transmission as described in claim 1, with means to control the retarding and cooling effect of said fan wheel comprising a housing for said fan wheel, said housing having an adjustable opening to permit control of the volume of air displaced by the said fan wheel.

4. A variable speed transmission as described in claim 1, with means to control the retarding effect of said fan wheel comprising a housing for said fan wheel, said housing having an adjustable opening to permit control of the volume of air displaced by the said fan wheel.

5. A variable speed transmission as described in claim 1, with means to control the cooling effect of said fan wheel comprising a housing for said fan wheel, said housing having an adjustable opening to permit control of the volume of air displaced by the said fan wheel.

6. A variable speed transmission as described in claim 2, with means to control the retarding effect and cooling effect of said fan wheel as required comprising a housing for said fan wheel, said housing having an adjustable opening to permit control of the volume of air displaced by the said fan wheel.

7. In a variable speed transmission as described in claim 1, the said adjustable V-belt drive comprising a pair of adjustable cone discs having positive adjusting means, rotated by said drive shaft, and a pair of adjustable cone discs having adjustable resilient actuation, mounted on the worm shaft, and a V-belt operatively connecting both pair of said cone discs.

8. In variable speed transmission as described in claim 2, the said adjustable V-belt drive comprising a pair of adjustable cone discs having positive adjusting means, rotated by said drive member, and a pair of adjustable cone discs having adjustable resilient actuation, mounted on the worm shaft, and a V-belt operatively connecting both pair of said cone discs.

9. In variable speed transmission as described in claim 1, the said adjustable V-belt drive comprising a pair of adjustable cone discs having adjustable resilient actuation, rotated by said drive shaft, and a pair of adjustable cone discs having positive adjusting means, mounted on the worm shaft, and a V-belt operatively connecting both pair of said cone discs.

10. In variable speed transmission as described in claim 2, the said adjustable V-belt drive comprising a pair of adjustable cone discs having adjustable resilient actuation, rotated by said drive member, and a pair of adjustable cone discs having positive adjusting means, mounted on the worm shaft, and a V-belt operatively connecting both pair of said cone discs.

ROBERT R. LOCKE.

REFERENCES CITED

The following references are of record in the file of this patent:

UNITED STATES PATENTS

| Number | Name | Date |
|---|---|---|
| 2,171,610 | Szekely | Sept. 5, 1939 |
| 2,259,823 | Locke | Oct. 21, 1941 |
| 2,266,085 | Sanderson | Dec. 16, 1941 |
| 2,279,961 | Whittaker | Apr. 14, 1942 |
| 2,359,526 | Locke | Oct. 3, 1944 |

OTHER REFERENCES (Publication) Product Engineer (page 133, January 1945).